(12) United States Patent
Tenev et al.

(10) Patent No.: US 6,654,761 B2
(45) Date of Patent: Nov. 25, 2003

(54) CONTROLLING WHICH PART OF DATA DEFINING A NODE-LINK STRUCTURE IS IN MEMORY

(75) Inventors: Tichomir G. Tenev, San Jose, CA (US); John O. Lamping, Los Altos, CA (US); Ramana B. Rao, San Francisco, CA (US)

(73) Assignee: Inxight Software, Inc., Sunnyvale, CA (US)

( * ) Notice: Subject to any disclaimer, the term of this patent is extended or adjusted under 35 U.S.C. 154(b) by 0 days.

(21) Appl. No.: 09/124,474

(22) Filed: Jul. 29, 1998

(65) Prior Publication Data

US 2001/0042062 A1 Nov. 15, 2001

(51) Int. Cl.[7] .................................................. G06F 7/00
(52) U.S. Cl. .............................. 707/102; 707/3; 707/10; 707/104.1; 707/101
(58) Field of Search ................................. 345/356, 357, 345/853; 707/512; 715/526

(56) References Cited

U.S. PATENT DOCUMENTS

| | | | |
|---|---|---|---|
| 5,295,243 A | * | 3/1994 | Robertson et al. .......... 395/160 |
| 5,333,254 A | * | 7/1994 | Robertson .................. 395/155 |
| 5,337,404 A | | 8/1994 | Baudelaire et al. ......... 395/141 |
| 5,339,390 A | | 8/1994 | Robertson et al. |
| 5,408,655 A | * | 4/1995 | Oren et al. .................. 395/600 |
| 5,515,487 A | | 5/1996 | Beaudet et al. ............. 395/140 |
| 5,515,488 A | * | 5/1996 | Hoppe et al. ............... 395/140 |
| 5,522,014 A | * | 5/1996 | Clark et al. .................. 706/45 |
| 5,522,022 A | * | 5/1996 | Rao et al. ................... 395/140 |
| 5,590,250 A | | 12/1996 | Lamping et al. ............ 395/127 |
| 5,604,841 A | * | 2/1997 | Hamilton et al. ............. 706/11 |
| 5,619,632 A | | 4/1997 | Lamping et al. ............ 395/141 |
| 5,632,009 A | | 5/1997 | Rao et al. |
| 5,634,062 A | * | 5/1997 | Shimizu et al. ............. 395/762 |
| 5,694,594 A | * | 12/1997 | Chang ......................... 707/10 |
| 5,786,820 A | * | 7/1998 | Robertson ................... 345/357 |
| 5,806,079 A | * | 9/1998 | Rivette et al. ............... 707/512 |
| 5,812,134 A | * | 9/1998 | Pooser et al. ............... 345/356 |
| 5,880,742 A | | 3/1999 | Rao et al. |
| 5,883,635 A | | 3/1999 | Rao et al. |
| 5,926,180 A | * | 7/1999 | Shimamura ................. 345/357 |
| 5,940,831 A | * | 8/1999 | Takano ........................ 707/10 |

(List continued on next page.)

FOREIGN PATENT DOCUMENTS

| | | |
|---|---|---|
| EP | 0 284 664 A2 | 10/1988 |
| EP | 0 717 346 A2 | 6/1996 |

OTHER PUBLICATIONS

"Reducing File System Latency using a predictive Approach"—James Griffioen, Randy Appleton—Proceedings of the 1994 Summer USENIX Conference—June—1994 (pps: 197–207).*

(List continued on next page.)

Primary Examiner—Kim Vu
Assistant Examiner—Anh Ly
(74) Attorney, Agent, or Firm—Mark A. Haynes; Haynes Beffel & Wolfeld LLP

(57) ABSTRACT

In a series of iterations, each of which automatically traverses a set of elements of a node-link structure, an iteration modifies the part of node-link data defining the structure that is in memory. The modified part of node-link data is more likely to define the set of elements that will be traversed by the next iteration. The iteration can determine whether to remove any of the part of node-link data, and then apply a criterion, such as a navigation history criterion or a least recently traversed criterion, to determine which of the part to remove. The iteration can also determine whether its set of elements includes an element with children that are not defined by the part of node-link data in memory, and can obtain a modified part that defines those children. Each iteration can, for example, prepare and present a representation of the node-link structure.

20 Claims, 11 Drawing Sheets

U.S. PATENT DOCUMENTS

| | | | | |
|---|---|---|---|---|
| 5,974,572 A | * | 10/1999 | Weinberg et al. | 714/47 |
| 6,029,195 A | * | 2/2000 | Herz | 707/10 |
| 6,085,202 A | | 7/2000 | Rao et al. | |
| 6,108,698 A | | 8/2000 | Tenev et al. | |
| 6,282,694 B1 | * | 8/2001 | Cheng et al. | 716/10 |
| 6,369,819 B1 | * | 4/2002 | Pitkow et al. | 345/853 |
| 6,377,259 B1 | * | 4/2002 | Tenev et al. | 345/440 |
| 6,377,287 B1 | * | 4/2002 | Hao et al. | 345/853 |
| 6,493,637 B1 | * | 12/2002 | Steeg | 702/19 |

OTHER PUBLICATIONS

"Static Caching in Web Servers"—Igor Tatarinov, Alex Rousskov and Valery Soloviev—IEEE—1997(pps: 410–417).*

Beckett, J., "Computer Whiz Burns to Learn, Ramana Rao wields technology smarts at Xerox startup," *San Francisco Chronicle*, Jun. 4, 1998.

Beier, T., and Neely, S., "Feature–Based Image Metamorphosis," *Siggraph '92, Computer Graphics Proceedings*, vol. 26, No. 2, Chicago, Jul. 1992, pp. 35–42.

Fairchild, K.M., Poltrock, S.E., and Furnas, G.W., "SemNet: Three–Dimensional Graphic Representations of Large Knowledge Bases," in Guindon, R., Ed., *Cognitive Science and its Application for Human Computer Interaction*, Lawrence Erlbaum, Hillsdale, N.J., 1988, pp. 201–233.

Koike, H., and Yoshihara, H., "Fractal Approaches for Visualizing Huge Hierarchies," *Proceedings of 1993 IEEE/CS Symposium on Visual Languages*, Aug. 24–27, 1993, pp. 55–60.

Lamping, J. and Rao, R., "The Hyperbolic Browser: A Focus+Context Technique for Visualizing Large Hierarchies," Sep. 5, 1995.

Matsuura, T., Taniguchi, K., Masuda, S., and Nakamura, T., "A Graph Editor for Large Trees with Browsing and Zooming Capabilities," *Systems and Computers in Japan*, vol. 24, No. 8, 1993, pp. 35–46.

Munzer, T., Burchard, P., and Chi, E.H., "Visualization through the World Wide Web with Geomview, Cyberview, W3Kit, and WebOOGL," a single page hardcopied from the Web site designated by the URL http://www.ncsa.uiuc.edu/SDG/IT94/Proceedings/VR/munzer/munzer–abstract.html. Hardcopy of changes file from the Web site designated by the URL http://www.geom.umn.edu/software/download/geomview.html, bearing date Oct. 21, 1994.

Munzer, T., and Burchard, P., "Visualizing the Structure of the World Wide Web in 3D Hyperbolic Space," hardcopied from Web site URL http://www.geom.umn.edu:80/docs/research/webviz/ and following sequence of nodes, dated Nov. 21, 1995, also published in Proceedings of VRML. '95, (San Diego, CA, Dec. 14–15, 1995), special issue of Computer Graphics, ACM SIGGRAPH, New York, 1995, pp. 33–38 & 138.

Walsh, J., "Web site development, InXight interface adds animation to site maps," *Infoworld*, May 18, 1998.

James Griffioen, Randy Appleton, "Reducing File System Latency using a Predictive Approach" (Jun. 1994), Proceedings of the Summer 1994 Usenix Conference, p. 197–207.

Ari Luotonen, Kevin Altis, Computer Networks and ISDN Systems 27 (1994) 147–154.

Igor Tatarinov, Alex Rousskov, Valery Soloviev, "Static Caching in Web Servers" IEEE, (1997) 1095–2055.

* cited by examiner

CONTROLLING WHICH PART OF DATA DEFINING A NODE-LINK STRUCTURE IS IN MEMORY

FIELD OF THE INVENTION

The invention relates to controlling which part of a body of node-link data is in memory.

BACKGROUND AND SUMMARY OF THE INVENTION

Netscape Navigator is a web browser that saves data about a number of recently visited web pages, making it possible to view the saved pages without accessing them through the web. A user can navigate through the saved pages by following links between them or by providing other navigation signals, such as by clicking on "Next" and "Back" buttons in the page frame presented by the browser. When a space limit is reached, previously saved pages are deleted to make room for newly visited pages.

Koike, H. and Yoshihara, H., "Fractal Approaches for Visualizing Huge Hierarchies", *Proceedings of the* 1993 *IEEE Symposium on Visual Languages,* Bergen, Norway, Aug. 24–27, 1993, pp. 55–60, disclose how fractal-based methods of information display can control the number of displayed nodes of a huge hierarchical structure. Fractal views calculate the degree of importance of each node and decide which node should be displayed or erased by comparing each node's value with a threshold. Once the threshold is set, the number of displayed nodes is constant, to keep the system's response time, and possibly the cognitive load, constant.

Matsuura, T., Taniguchi, K., Masuda, S., and Nakamura, T., "A Graph Editor for Large Trees with Browsing and Zooming Capabilities", *Systems and Computers in Japan,* Vol. 24, No. 8, 1993, pp. 35–46, disclose a library program which allows direct manipulation of a large tree on a display. Because of screen size limitations, the disclosed program displays both an outline of a tree and details of one or more parts of the tree. The user can use a mouse to move the selected region that is displayed in detail.

Beaudet et al., U.S. Pat. No. 5,515,487, disclose selective display of portions of graphics by expanding and collapsing nodes in trees, directed acyclic graphs, and cyclic graphs.

Windows NT Explorer is a program that can be used to see the hierarchy of folders on a disk drive. Some folders are presented with plus signs (+), and if the user does a mouse click on a plus sign, more folders will be displayed.

The invention addresses problems in storing in memory a body of data defining a node-link structure, referred to herein as "node-link data". In a simple case, all the node-link data defining a structure can be stored in memory, including additional data for presenting all or part of the structure. But this technique is not adequate in many situations.

One situation that requires a different technique is when node-link data defining a large or complex structure are greater than the available memory space. Another is when node-link data are not all concurrently available, due, for example, to low speed retrieval from a remote source or to modifications occurring elsewhere in parts of the data.

The invention provides techniques that alleviate these problems in storing node-link structures. The techniques control which part of node-link data defining a structure is in memory. In performing one of a series of iterations, each of which includes automatically traversing a set of elements in the node-link structure;, each of the techniques modifies which part of node-link data is in the memory so that the part of node-link data in the memory is likely to define the set of elements that will be traversed by the next iteration.

Each iteration in the series could be any operation that accesses data relating to elements within node-link data defining the structure. Each iteration could, for example, prepare and present a representation of the node-link structure. Other examples of operations that can automatically traverse elements include display operations such as layout, mapping, and painting; other operations that obtain positions of elements in a space; search or retrieval operations; operations that obtain data characterizing the structure, such as by scanning the elements of the structure; operations that make decisions based upon or relating to the structure by analyzing its elements; and so forth.

In modifying which part of node-link data is in memory, the iteration can determine whether to remove any of the node-link data from memory. Upon determining to do so, the iteration can apply a criterion to determine which part to remove. For example, each iteration can receive a navigation signal, and the criterion can be a navigation history criterion. More generally, the criterion can select an element that is least recently traversed, such as from a list of nodes defined by the part of node-link data in memory, with the nodes ordered within the list according to how recently each node has been traversed.

In modifying which part of node-link data is in memory, the iteration can also determine whether any of the elements traversed by the iteration have children that are not defined by the part of node-link data in memory. For example, the techniques can access uncreated children data that indicate, for each node defined by the part of node-link data in memory, whether the node has children that are not defined by the part of the node-link data in memory. If the iteration's set of elements includes an element with undefined children, the iteration can determine to modify the part of node-link data in memory to define the undefined children.

The part of node-link data in memory can include a node element representing each node in the iteration's set of elements, and the part can be modified by adding an additional node element representing a node that is not in the set of elements. Similarly, an additional link element can be added representing a link to the added node. Further, the part of node-link data in memory can include at least one node element representing a node that is not in the iteration's set of elements, and the part can be modified by deleting at least one such node element. Similarly, for each deleted node element, at least one link element can be deleted that represents a link to or from the represented node.

The techniques can be implemented in a system with memory for storing node-link data and a processor for controlling which part of the node-link data is in memory. The techniques can also be implemented in an article of manufacture with a storage medium storing instruction data for execution by a processor. The techniques can also be implemented in a method of transferring instruction data between two machines.

The new techniques are advantageous because they make it possible to load a very large node-link structure incrementally as well as to unload and reload parts of the structure as necessary. The new techniques can accomplish these objectives even though the part of the node-link data in memory can occupy no more than a fixed amount of memory. Furthermore, the techniques can apply criteria based on user input indicating interest in different elements of the structure. As a result, in an implementation in which a user provides navigation signals requesting that selected elements of the node-link structure be displayed, the part of the structure in memory is likely to include the elements the user will select for display.

Another advantage is that the new techniques can be combined with and used to implement cacheing and prefetching of node-link data defining a structure.

Yet further advantages arise because less data is transferred in and out of memory, and because data transfer occurs only when necessary. As a result, the initial display of a large node-link structure can be presented much more quickly, and less computation is necessary to present the node-link structure.

In comparison with conventional cacheing techniques, such as the Netscape web page cacheing techniques described above, the new techniques can be implemented to provide a more easily understood representation of the node-link structure. Although the new techniques may be applied to the same types of underlying node-link structures as conventional techniques, the new techniques can be implemented to maintain data in memory that define a series of more integrated structures for presentation. Within the series, each element can always have a path to the root, with no orphans permitted, and no currently presented element can be removed from memory. Furthermore, the new techniques can be implemented to add an element to memory when its parent is presented, thus increasing the likelihood that the part of node-link data in memory defines elements that will be included in future presentations.

The following description, the drawings, and the claims further set forth these and other aspects, objects, features, and advantages of the invention.

DETAILED DESCRIPTION OF THE INVENTION

A. Conceptual Framework

Figure 1:
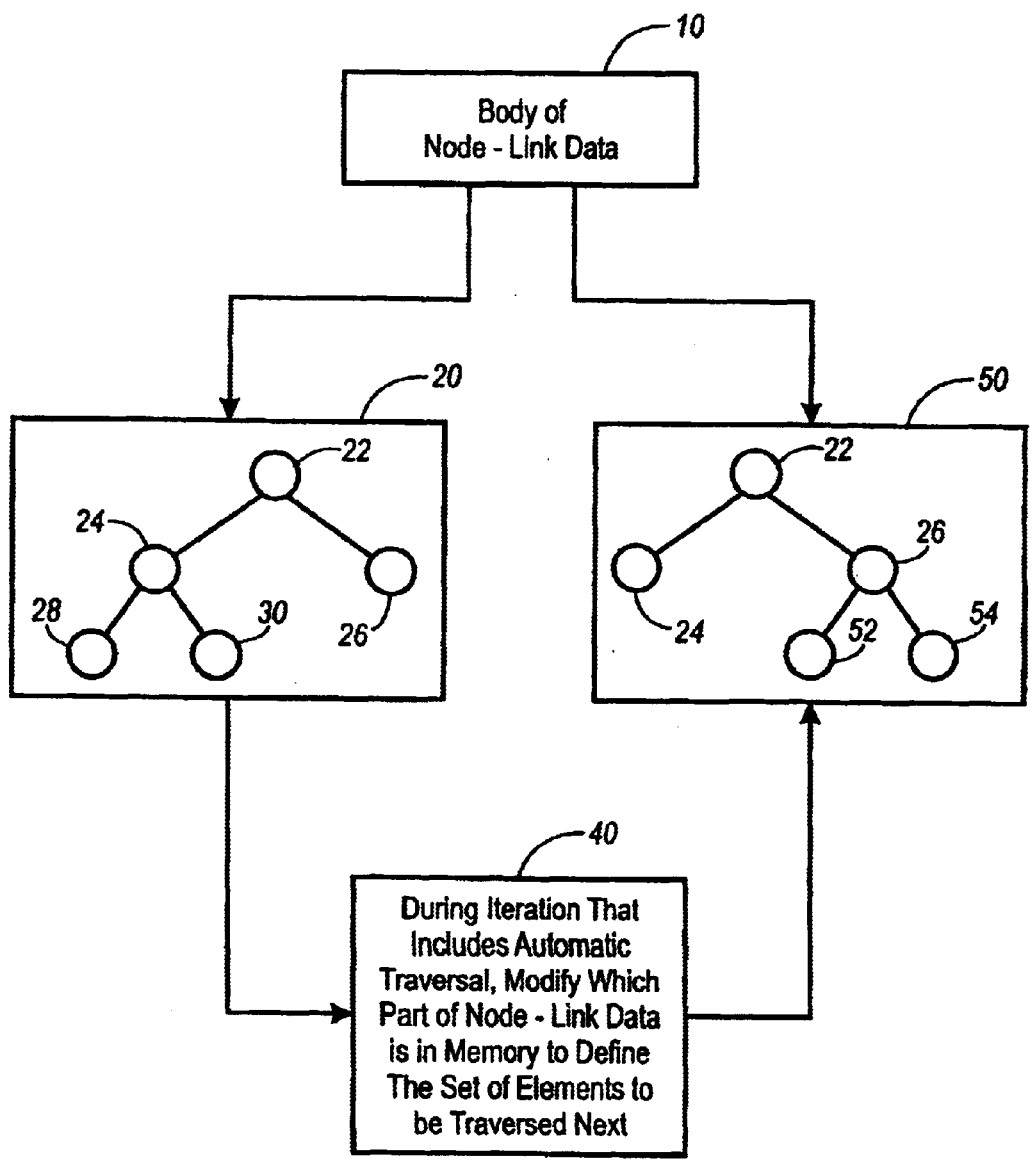
FIG. 1 is a schematic flow diagram showing a way to control which part of data defining a node-link structure is in memory.

The following conceptual framework, when taken with the conceptual frameworks set forth in U.S. Pat. Nos. 5,590,250 and 5,619,632, incorporated herein by reference, is helpful in understanding the broad scope of the invention, and the terms defined below have the indicated meanings throughout this application, including the claims.

A "node-link structure" is a structure that includes items that can be distinguished into nodes and links, with each link relating two or more of the nodes. A "graph" is a node-link structure in which each link relates two nodes. A "directed graph" is a graph in which each link indicates direction between the nodes it relates, with one node being a source or "from-node" of the link and the other being a destination or "to-node" of the link. An "acyclic directed graph" is a directed graph in which the links, when followed in their indicated directions, do not provide a path from any node back to itself. A "tree" is an acyclic directed graph with exactly one root node such that, for any non-root node in the tree, the links, when followed in their indicated directions, provide only one path that begins at the root node and leads to the non-root node.

The "elements" of a node-link structure are its nodes and links.

In a node-link structure, a "node-link relationship" is a relationship between elements based on paths of nodes and links between or among the elements.

In many cases, node-link relationships can be summarized by category. In a directed graph, for example, the "children" of an element are the elements that can be reached from the element by following no more than one link in its indicated direction. Similarly, the "parents" of an element are the elements that can be reached from the element by following no more than one link opposite its indicated direction. Children and parents of a node thus include links and nodes, while children and parents of a link include only nodes. The "descendants" of an element include all of its children, the children of its children ("grandchildren"), etc. The "ancestors" of an element include all of its parents, the parents of its parents ("grandparents"), etc. The "siblings" of an element include all the other children of its parents. The "co-parents" of an element include all the other parents of its children.

The term "node-link data defining a node-link structure" is used herein to designate a body of data that would, if it existed in its entirety, define the complete node-link structure.

A part of node-link data defining a node-link structure "is in a memory" if the part is stored in some combination of memory circuitry and devices such that it can be accessed by a processor. The combination of memory circuitry and devices could include, for example, main memory, local memory, remote memory, or input/output devices, and could include random access memory (RAM), read only memory (ROM), and one or more storage medium access devices with data storage media that they can access.

As used herein, a "series of iterations" is a series of operations that can be divided into two or more consecutive parts, each of which is referred to herein as an iteration. Although iterations in a series may differ significantly, each iteration after the first can typically use starting data produced by the preceding iteration to obtain ending data. Typically, each iteration's ending data can in turn be used by the following iteration as its starting data.

An iteration "traverses" an element of a node-link structure when the iteration includes an operation that accesses data relating to the element within a part of node-link data defining the structure that is in memory. An iteration "traverses a set of elements" if the iteration traverses every element in the set. An iteration "automatically traverses" a set of elements if it traverses every element in the set independent of concurrent human control. A "traversal" is a completed act of traversing.

An iteration includes "modifying which part of node-link data is in memory" if the iteration includes operations that change the part of node-link data defining a node-link structure that is in memory to define a different subset of the elements of the node-link structure. An iteration "obtains a modified part of the node-link data in memory" if it modifies which part of node-link data is in memory.

A modified part of node-link data is "more likely to define" a set of elements that will be traversed if, when compared in realistic conditions with the part of node-link data in memory before the modified part was obtained, the modified part more frequently defines all of the elements in a set subsequently traversed. The comparison can be made over a sufficient number of traversals to achieve an appropriate level of statistical significance.

An operation "removes" some of the part of node-link data in memory if the operation modifies the part of node-link data so that it no longer defines some elements that it defined prior to the operation.

An operation "applies a criterion" if the operation uses a criterion to reach a determination, such as which of a part of node-link data in memory to remove.

The term "navigation signal" is used herein to mean a signal that indicates that the user has greater interest in a part of a node-link structure than in other parts. For example, an "expand signal" indicates a request to present a representation of a graph in which the representation of an element of the graph is expanded, while a "contract signal" indicates a request to present a representation of a graph in which the representation of an element of the graph is contracted. Other examples include requests to present a part of the node-link structure at a specific position, which can be done by selecting a bookmark or the like or by a point and click operation requesting that a feature pointed to be moved to a center of focus.

The term "navigation history criterion" is used herein to mean a criterion that relates, at least in part, to previous navigation signals.

A "processor" is a component of circuitry that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations.

A "network" is a combination of circuitry through which a connection for transfer of data can be established between machines.

B. General Features

Figure 2:
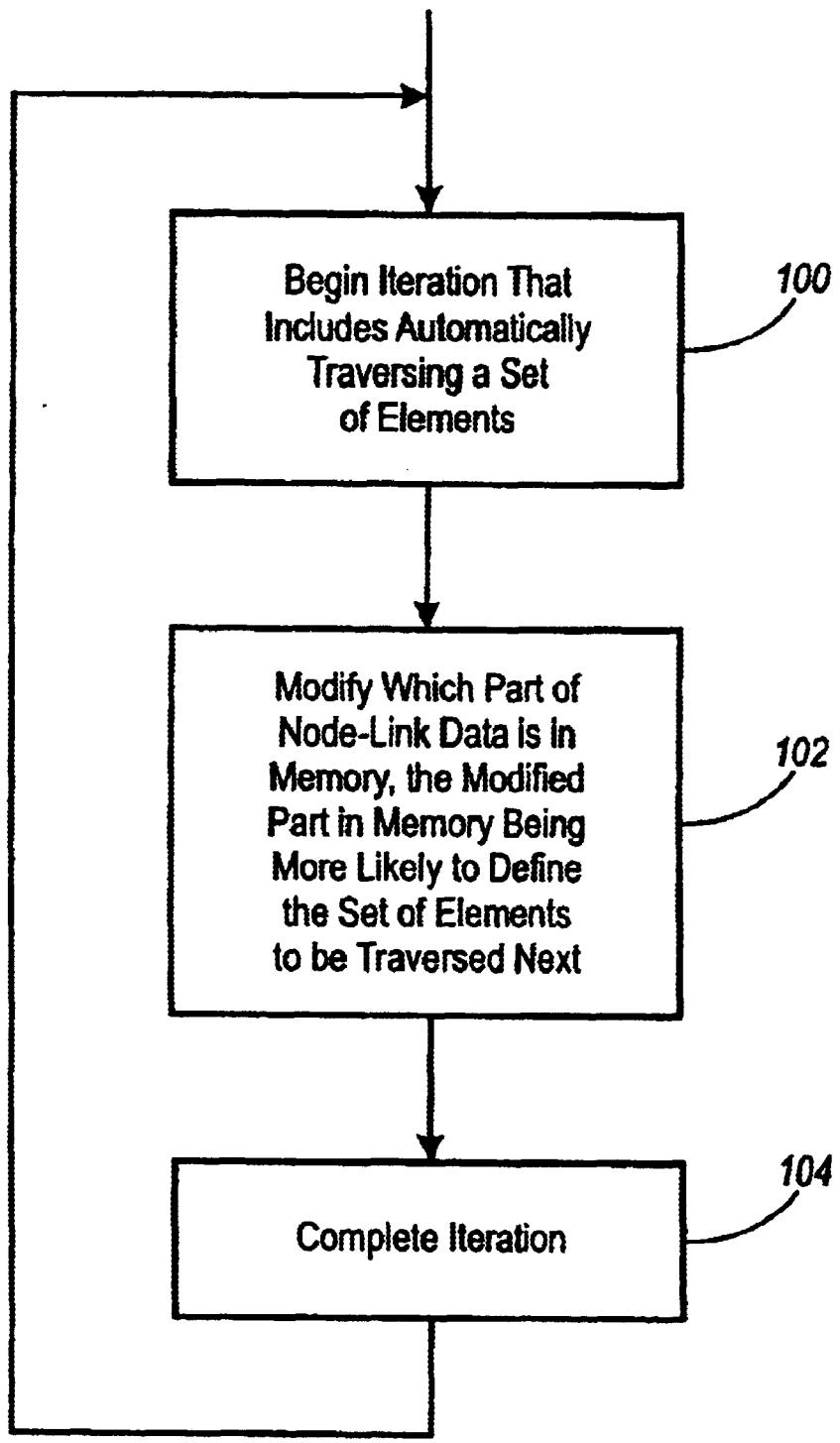
FIG. 2 is a flow chart showing general acts in performing control as illustrated in FIG. 1.
Figure 3:
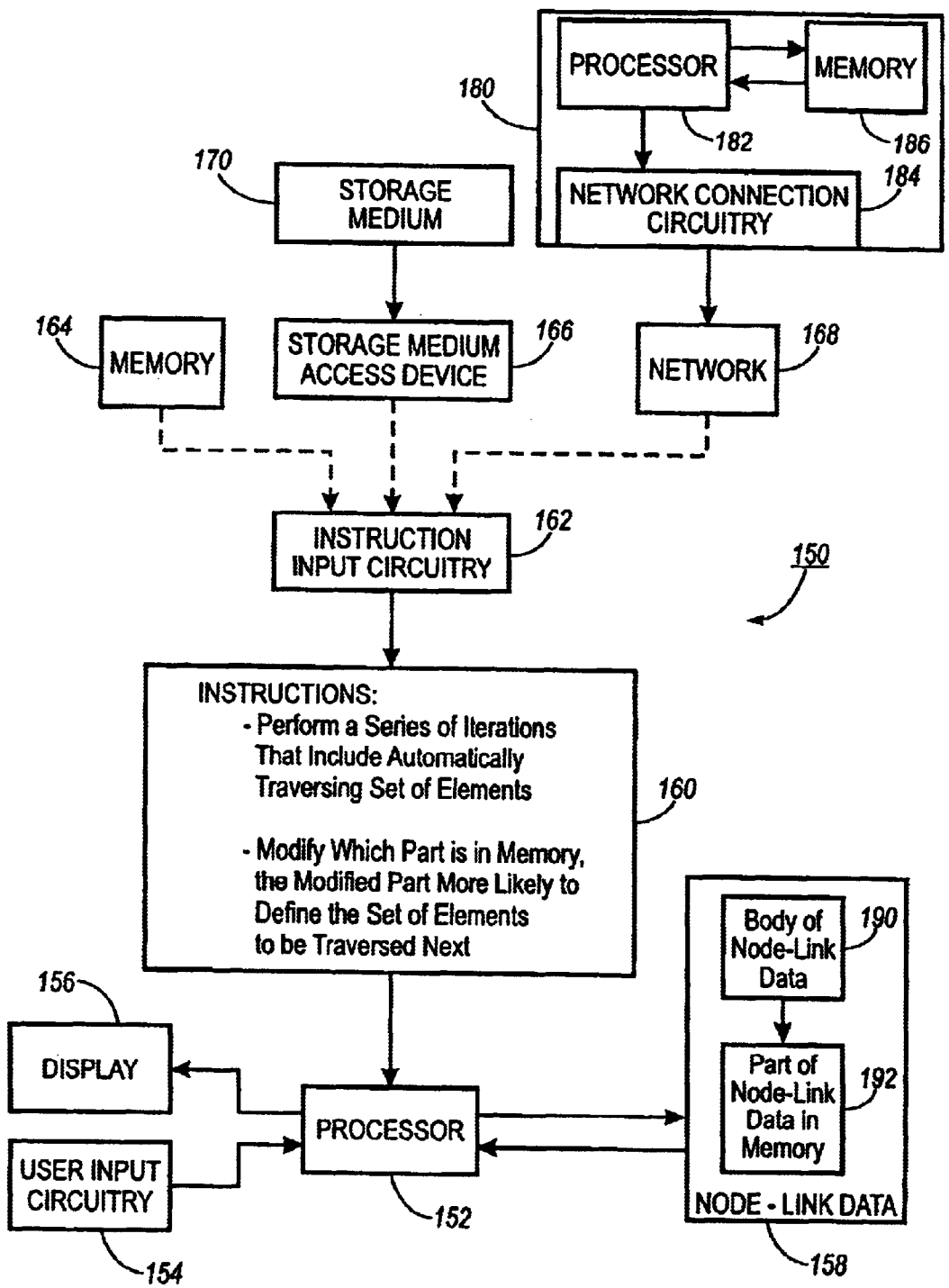
FIG. 3 is a schematic diagram showing general components of a machine that performs control as illustrated in FIG. 1.

FIGS. 1–3 show general features of the invention.

In FIG. 1, body of node-link data 10 defines a node-link structure. Box 20 illustrates the part of the node-link structure that is defined by a part of body 10 that is in a memory. In the illustrated part of the node-link structure, node 22 is the parent of child nodes 24 and 26, and child node 24 is the parent of grandchild nodes 28 and 30.

In box 40, one of a series of iterations is performed that includes automatically traversing a set of elements of the node-link structure. The iteration could include any operation that automatically traverses elements, a number of examples of which are listed above. The iteration includes modifying which part of body 10 is in memory so that it defines the set of elements to be traversed in the next iteration that includes automatic traversal. Box 40 can include removing data from memory and adding other data to memory from body 10 so that a different part of the node-link structure is defined by the part of body 10 that is in memory. As illustrated in box 50, data defining nodes 22, 24, and 26 are in memory, but data defining grandchild nodes 28 and 30 are no longer in memory, and data defining grandchild nodes 52 and 54, children of child node 26, have been added to memory.

In FIG. 2, the act in box 100 begins an iteration that includes automatically traversing a set of elements of a node-link structure. The act in box 100 could begin an iteration that performs one of the operations listed above or any other operation that includes automatic traversal of the structure.

During the iteration, the act in box 102 modifies which part of the node-link data defining the node-link structure is in memory. The modified part of the node-link data in memory is more likely to define the set of elements to be traversed by the next iteration that includes automatic traversal.

The act in box 104 completes the iteration that began in box 100 and that included the act in box 102. As shown by the arrow from box 104 back to box 100, the acts in boxes 100, 102, and 104 can be performed in each of a series of iterations, each iteration including automatically traversing a respective set of elements of the structure.

Machine 150 in FIG. 3 includes processor 152 connected for receiving data indicating user signals from user input circuitry 154 and for providing data defining images to display 156. Processor 152 is also connected for accessing node-link data 158, which define a node-link structure. As illustrated, node-link data 158 include body 190 of node-link data defining a node-link structure and also include part 192 of node-link data in memory. Processor 152 is also connected for receiving instruction data 160 indicating instructions through instruction input circuitry 162, which can illustratively provide instructions received from connections to memory 164, storage medium access device 166, or network 168.

In executing the instructions indicated by instruction data 160, processor 152 performs a series of iterations, each of which includes automatically traversing a respective set of elements in the node-link structure defined by body 190 of node-link data. Each iteration can be initiated, for example, when processor 152 receives a request for an operation, such as by receiving signals from user input circuitry 154 indicating a part of a node-link structure of interest to the user. In performing an iteration, processor 152 modifies which part of node-link data is in memory, such as by removing data from part 192 and by adding data from body 190 to part 192. Processor 152 performs the modifications so that part 192 as modified is more likely to define the set of elements that will be traversed next.

As noted above, FIG. 3 illustrates three possible sources from which instruction input circuitry 162 could receive data indicating instructions—memory 164, storage medium access device 166, and network 168.

Memory 164 could be any conventional memory within machine 150, including random access memory (RAM) or read-only memory (ROM), or could be a peripheral or remote memory device of any kind. More generally, memory 164 could be a combination of more than one type of memory component.

Storage medium access device 166 could be a drive or other appropriate device or circuitry for accessing storage medium 170, which could, for example, be a magnetic medium such as a set of one or more tapes, diskettes, or floppy disks; an optical medium such as a set of one or more CD-ROMs; or any other appropriate medium for storing data. Storage medium 170 could be a part of machine 150, a part of a server or other peripheral or remote memory device, or a software product. In each of these cases, storage medium 170 is an article of manufacture that can be used by machine 150. Data units can be positioned on storage medium 170 so that storage medium access device 166 can access the data units and provide them in a sequence to processor 152 through instruction input circuitry 162. When provided in the sequence, the data units form instruction data 160, indicating instructions as illustrated.

Network 168 can provide instruction data 160 received from machine 180. Processor 182 in machine 180 can establish a connection with processor 152 over network 168 through network connection circuitry 184 and instruction input circuitry 162. Either processor could initiate the connection, and the connection could be established by any appropriate protocol. Then processor 182 can access instruction data stored in memory 186 and transfer the instruction data over network 168 to processor 152 so that processor 152 can receive instruction data 160 from network 168. Instruction data 160 can then be stored in memory 164 or elsewhere by processor 152, and can be executed.

C. Implementation

The general features described above could be implemented in numerous ways on various machines to present node-link representations. An implementation described below has been implemented on a PC-based system running the 32 bit versions of Microsoft Windows and executing code compiled from C++ language source code.

C.1. System

Figure 4:
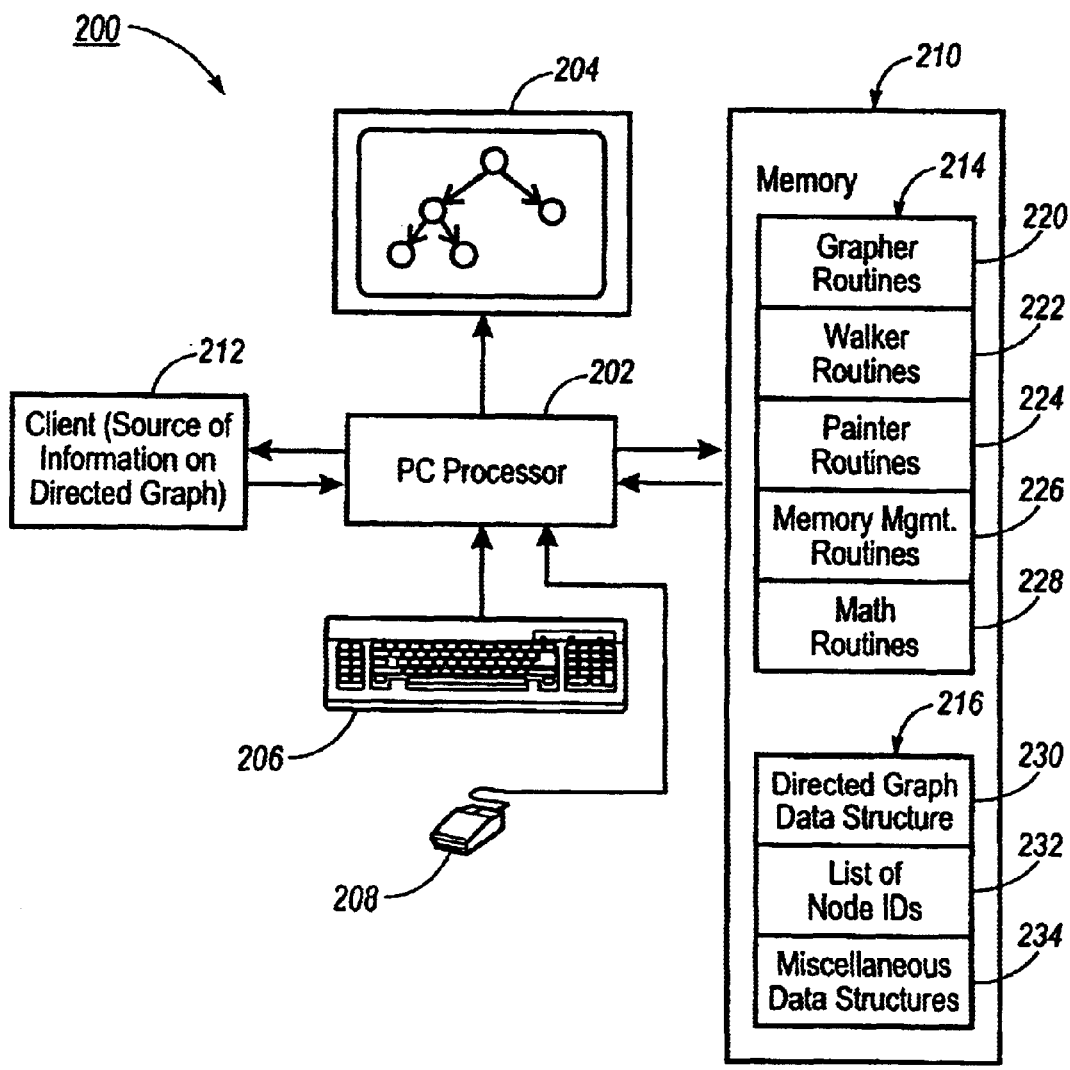
FIG. 4 is a schematic diagram of a system.

In FIG. 4, system 200 includes PC processor 202, which is connected to display 204 for presenting images and to keyboard 206 and mouse 208 for providing signals from a user. PC processor 202 is also connected so that it can access memory 210 and client 212. Memory 210 can illustratively include program memory 214 and data memory 216. Client 212 is a source of information about a directed graph, which could be a combination of routines and data stored in memory 210 or could be independent of memory 210 as shown. For example, processor 202 could communicate with client 212 through a network.

The routines stored in program memory 214 can be grouped into several functions. Grapher routines 220 create and modify a data structure representing the directed graph defined by the information from client 212. Walker routines 222 respond to navigation signals and other user signals from keyboard 206 and mouse 208 by obtaining information from the directed graph data structure. Painter routines 224 provide signals to display 204 to cause it to present representations of the directed graph data structure. Memory management routines 226 can be called by grapher routines 220 in applying a navigation history criterion to determine whether to modify which part of the directed graph data structure is in memory 210. Math routines 228 can be called to obtain positions of elements of the directed graph in a layout space.

Data memory 216 in turn contains data structures accessed by processor 202 during execution of routines in program memory 214. Directed graph data structure 230, as noted above, can be created and modified by grapher routines 220 and can also be accessed by walker routines 222 and painter routines 224. List of node IDs 232 can be created and maintained by memory management routines 226 to hold information about navigation history in relation to the directed graph defined by directed graph data structure 230. The routines in program memory 214 can also access various miscellaneous data structures 234. Data structures 234 may, for example, include an extra data structure for mapping from a pair of node IDs to a link ID, implemented as a standard heap; this extra data structure allows lookup and insertion of a link ID in time that is logarithmic in the number of links.

C.2. Directed Graph Data Structure

Figure 5:
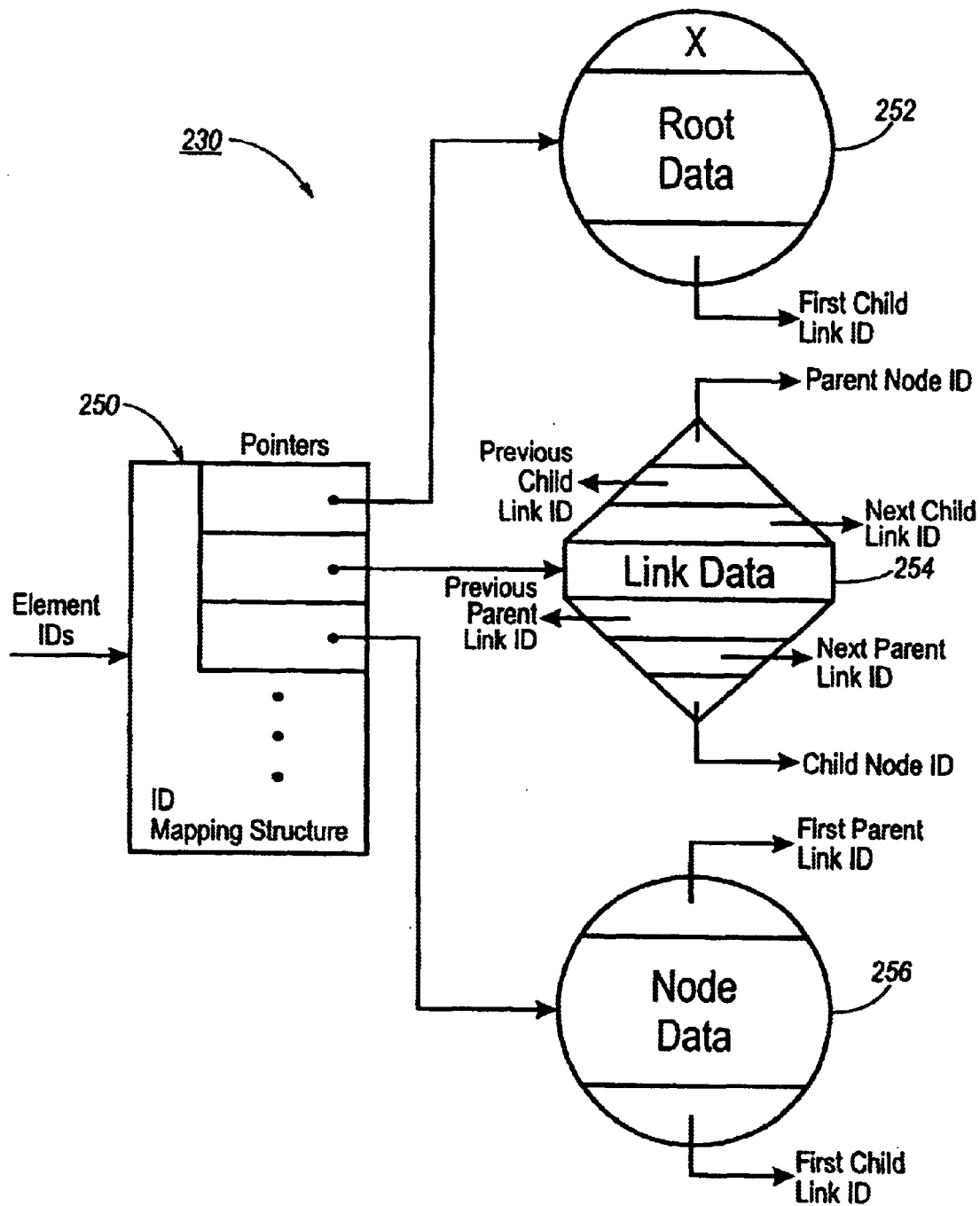
FIG. 5 is a schematic diagram of a directed graph data structure.

FIG. 5 illustrates features of directed graph data structure 230 that are relevant to the operations performed by memory management routines 226.

Identifier (ID) mapping structure 250 maps from element IDs to pointers. The element IDs include node IDs and link IDs. Structure 250 makes it possible for every node and link in memory to be specified by an ID which can be validated in constant time and nearly always created in constant time; structure 250 avoids the need to use pointers except within directed graph data structure 230. Although implemented as two arrays of pointers, one indexed by node IDs and the other by link IDs, structure 250 could also be, for example, a lookup table in which each entry includes an ID and a pointer.

Root node element 252 represents a special node that is always in memory and whose children can be chosen by client 212 according to any appropriate criterion. For example, the children of root node element 252 could include links to all other nodes, to all other nodes that have no other parent, or only to one node that is the natural starting node of structure 230, such as a node representing a file system root or a web site home page. Therefore, the upper level of element 252 has an "x" to indicate that it has no parent, while the lower level has the ID of its first child link. The central level of element 252 may contain appropriate data relevant to the root node it represents.

Link element 254 represents a link between a parent node and a child node, the IDs of which are in its uppermost and lowermost levels. The two levels just below the parent node's ID are the IDs of the previous child link and the next child link from the parent node, respectively. Similarly, the two levels just above the child node's ID are the IDs of the previous parent link and the next parent link leading to the child node, respectively. As in element 252, the central level of element 254 may contain appropriate data relevant to the link it represents.

Node element 256 represents a node that is currently in memory but that is subject to being removed in accordance with the memory management techniques described below. Therefore, the upper level of element 256 has the ID of its first parent link and the lower level has the ID of its first child link. As with element 252, the central level of element 256 may contain appropriate data relevant to the node it represents. For example, the central level may include a pointer to the node's entry in the list of node IDs described below, thus allowing removal of the node's entry from the list in constant time without performing a search.

Further details about the implementation of directed graph data structure 230 are set forth in copending coassigned U.S. patent application Ser. No. 09/124,338, entitled "Node-Link Data Defining a Graph and a Tree Within the Graph", incorporated herein by reference.

C.3. List of Node IDs

Figure 6:
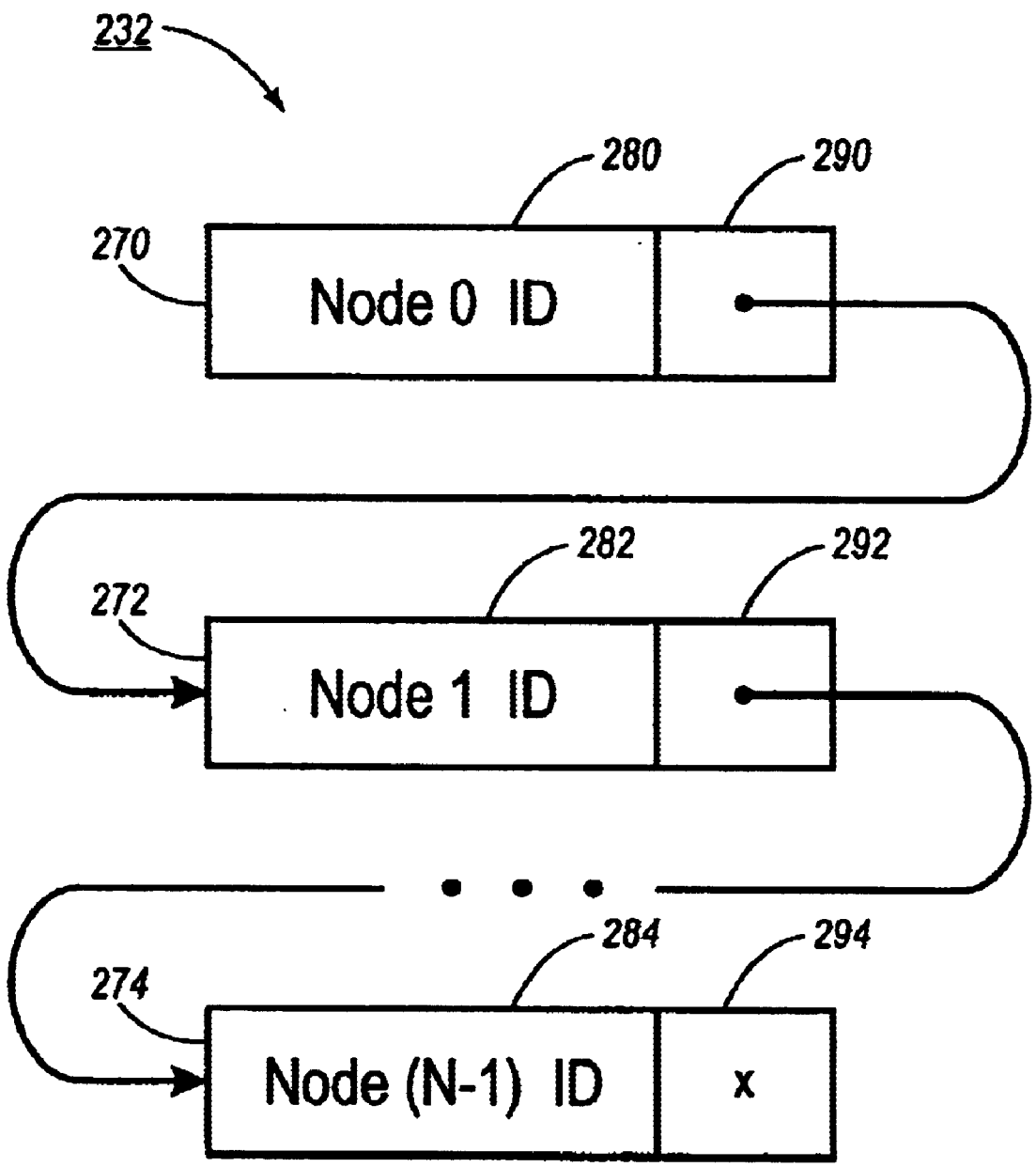
FIG. 6 is a schematic diagram of a list of node identifiers (IDs).

FIG. 6 shows an implementation of list of node IDs 232 as a linked list of N entries 270, 272, through 274. N can be any value less than $N_{MAX}$, the maximum number of nodes permitted in memory.

In the illustrated implementation, each entry includes a node ID field 280, 282, through 284. This field simply indicates the ID of a node.

Each entry also includes a pointer field 290, 292, through 294, which includes a pointer to the next entry in the linked list or, in the case of field 294, a special value indicating the last entry in the list, shown as "x".

As explained in greater detail below, list 232 is managed so that the most recently handled node is in the zeroth entry, while the least recently handled node is in the (N−1)th entry. Therefore, the position of a node's entry in list 232 indicates the ranking of the node in terms of how recently each node was handled.

C.4. Operations

Figure 7:
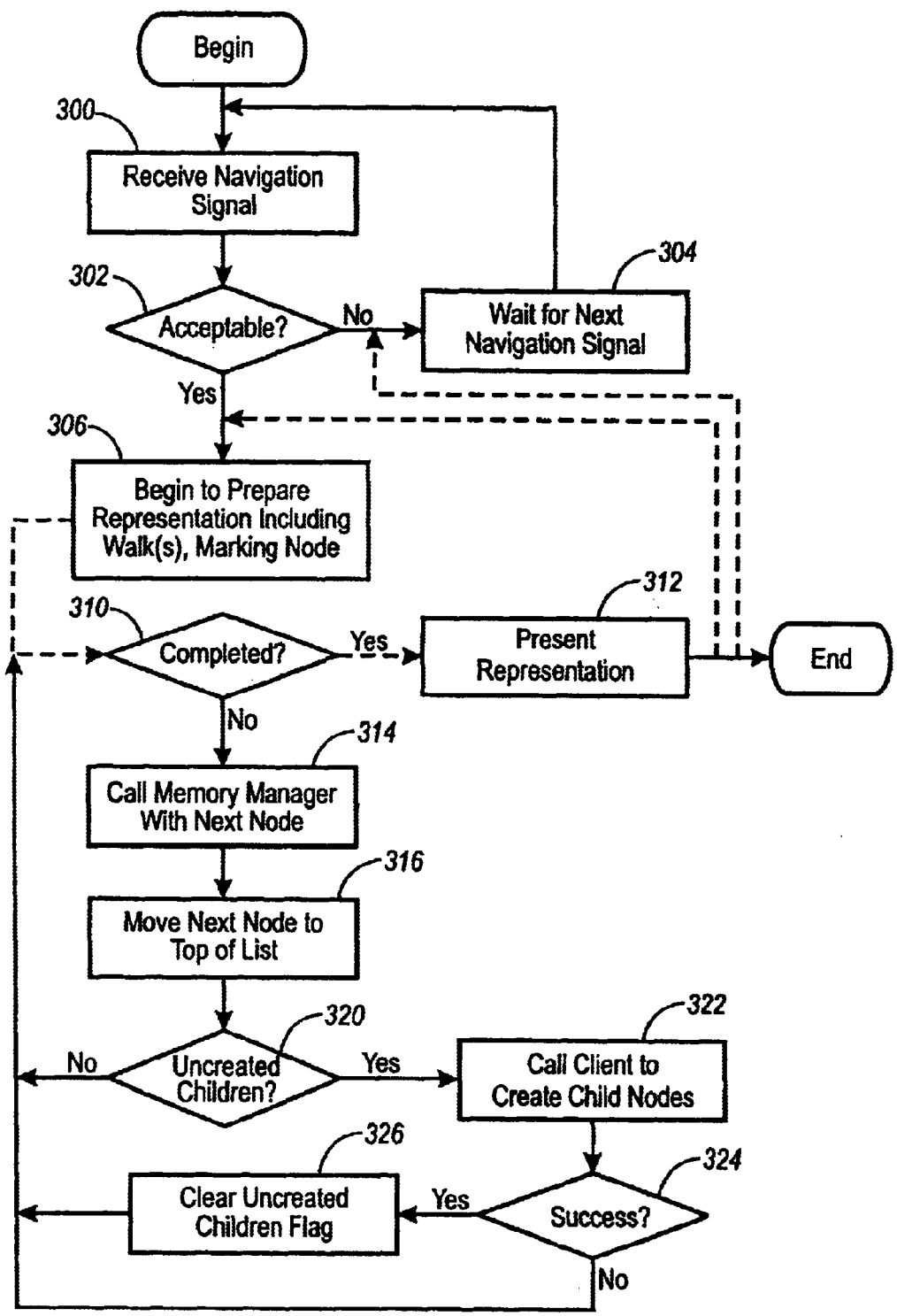
FIG. 7 is a flow chart showing how the routines in FIG. 4 respond to navigation signals.

FIG. 7 shows operations that can be performed by grapher routines 220 and walker routines 222 in response to a navigation signal. Operations in FIG. 7 can be performed at least once in responding to each acceptable navigation signal.

The technique of FIG. 7 modifies the set of nodes and links in memory during an iteration that includes automatic traversal, producing a modified set that is more likely to include all the elements that will be traversed in the next iteration. A modified set that meets this standard is sometimes referred to herein as a "predictive node-link set". Of course, the technique of FIG. 7 can also modify the set to include any elements that were not loaded but that are traversed in the current iteration.

The technique of FIG. 7 produces a predictive node-link set for the next iteration by adding a node (and a link from its parent to the node) to the set in memory if the node's parent is traversed during the current iteration.

The illustrated operations begin upon receiving a navigation signal in box 300. The navigation signal could be a signal requesting a change of focus to a different part of a graph being displayed or a signal requesting that a node in the graph be expanded to show its descendants or contracted to hide its descendants. The routines can initially test whether the navigation signal is acceptable, in box 302, such as by a call invoking an upward walk to determine whether any of the node's ancestors is a clone of the node, in which case cycling can be avoided by not expanding the node. If the navigation signal is not acceptable, the routines take no action in response to the navigation signal, but rather wait for the next navigation signal, in box 304.

When the test in box 302 determines that an acceptable navigation signal has been received, the routines begin an iteration that prepares a representation of the graph in response to the navigation signal, in box 306. In doing so, walker routines 222 are called to perform one or more walking traversals of directed graph data structure 230, during which nodes are marked with counts to indicate that they have been walked.

In performing a walk, walker routines 222 can obtain the node ID of the next node to be walked by using the link and node IDs in directed graph data structure 230, the walk counter values described below, and the expansion flags described in relation to FIGS. 4–6 and elsewhere in copending coassigned U.S. patent application Ser. No. 09/124,338, entitled "Node-Link Data Defining a Graph and a Tree Within the Graph", incorporated herein by reference. As described there, expansion flags can define a tree within the graph defined by data structure 230, and walker routines 222 can walk upward along a path from a selected node of the tree to the root node, then walk back down the path to orient the selected node, then walk back up the path to a visibility root node, and then do a walk through the descendants of the visibility root node in the tree, as described in copending coassigned U.S. patent application Ser. No. 09/124,529, entitled "Mapping a Node-Link Structure to a Rendering Space Beginning from any Node", incorporated herein by reference.

While performing the walk upward to the root node and back to the selected node, walker routines 222 can mark each node with an orient count that indicates that the node was walked in the most recent walk to orient a selected node, thus preserving some navigation history. Similarly, while performing the walk through the descendants of the visibility root node, walker routines 222 can mark each node with a map count that indicates that the node was walked in the most recent walk to map descendants of the visibility root node, thus preserving additional navigation history. The orient count and the map count stored by walker routines 222 can be based on respective global counters, with the count of all nodes traversed on a given walk being equal to a global counter's value. A node with a different stored count value was not traversed on the given walk.

As discussed below, the most recently walked nodes, as indicated either by their orient counts or their map counts, cannot be removed from memory.

Preparation of the representation also includes an iterative inner loop that begins and ends with the test in box 310. As suggested by the dashed lines into and out of box 310, preparation of a representation can include other operations in addition to the iterative inner loop and the walking traversals, some of which are described in copending coassigned U.S. patent application Ser. No. 09/124,529, entitled "Mapping a Node-Link Structure to a Rendering Space Beginning from any Node", incorporated herein by reference.

When the iterative inner loop is completed, box 310 branches to present a representation of the graph, in box 312. To present the representation, the routines could, for example, make calls invoking operations like those described in copending coassigned U.S. patent application Ser. No. 09/124,529, entitled "Mapping a Node-Link Structure to a Rendering Space Beginning from any Node", incorporated herein by reference. As suggested by the dashed line from box 312 back to box 306, a series of representations could be prepared and presented in response to one of the navigation signals. As suggested by the dashed line from box 312 back to box 304, when the response to a navigation signal is completed, a response to another navigation signal can be provided.

In addition to other operations, each iteration of the inner loop calls memory management routines 226 with the node ID of the next node to be handled, in box 314. The inner loop can, for example, be included in a painting operation performed by walking routines 222, in which each node on a stack of nodes to be painted is handled in turn, and in which appropriate calls to painter routines 224 are also made for each node.

In response to the call in box 314, memory management routines 226 move the next node to the top of list 232, in box 316. In box 320, memory management routines 226 also determine whether the next node has any children that are not in memory, referred to herein as "uncreated child nodes". This can be determined from an uncreated children flag for the node, a flag that can generally be controlled by client 212 but is accessible to other routines.

If the node has uncreated child nodes, a call is made in box 322 to client 212, requesting creation of the uncreated child nodes. In this and similar contexts in which a node does not have an assigned node ID because it is not currently in memory, a call to client 212 can refer to the node by its parent's node ID and, if appropriate, by a numerical indication of which child it is, e.g. the nth child of node X. Client 212 has access to more complete information about the node-link structure, which can be thought of as a "protograph", and client 212 can use that information and the node ID of the parent to obtain information about each uncreated child. For example, with the node ID, client 212 can access the node's data item as shown in FIG. 5, and the data item's node data can include a unique identifier originally provided by client 212 at the time the node's data item was created. Client 212 can then use this unique identifier to access the relevant information in the photograph. If the node is a web page, for example, the unique identifier could be a hypertext link that can be used to obtain information about the node's children and parents. Client 212 could also maintain a cache of recently created nodes and related links, to allow immediate creation. If the call in box 322 were to create a non-cached node, client 212 could schedule asynchronous creation of that node in the background, while indicating unsuccessful child creation.

In creating nodes in response to a call in box 322, client 212 in turn makes a request to create the nodes, which results in a call to grapher routines 220. Grapher routines 220, in turn, call memory management routines 226, as discussed below in relation to FIG. 8. These routines return with an indication whether the requested nodes can be created; if not, the routines could return a null ID, for example. As shown in box 324, client 212 can branch based on whether it succeeds in creating the nodes. If so, client 212 clears the parent's uncreated child flag, in box 326, before returning to box 310. If child creation is not successful, the uncreated children flag is not cleared, but the routines continue with box 310.

If the set of nodes in memory when a navigation signal is received in box 300 does not include all the elements to be traversed, client 212 can be notified with a request to provide the uncreated nodes.

Figure 8:
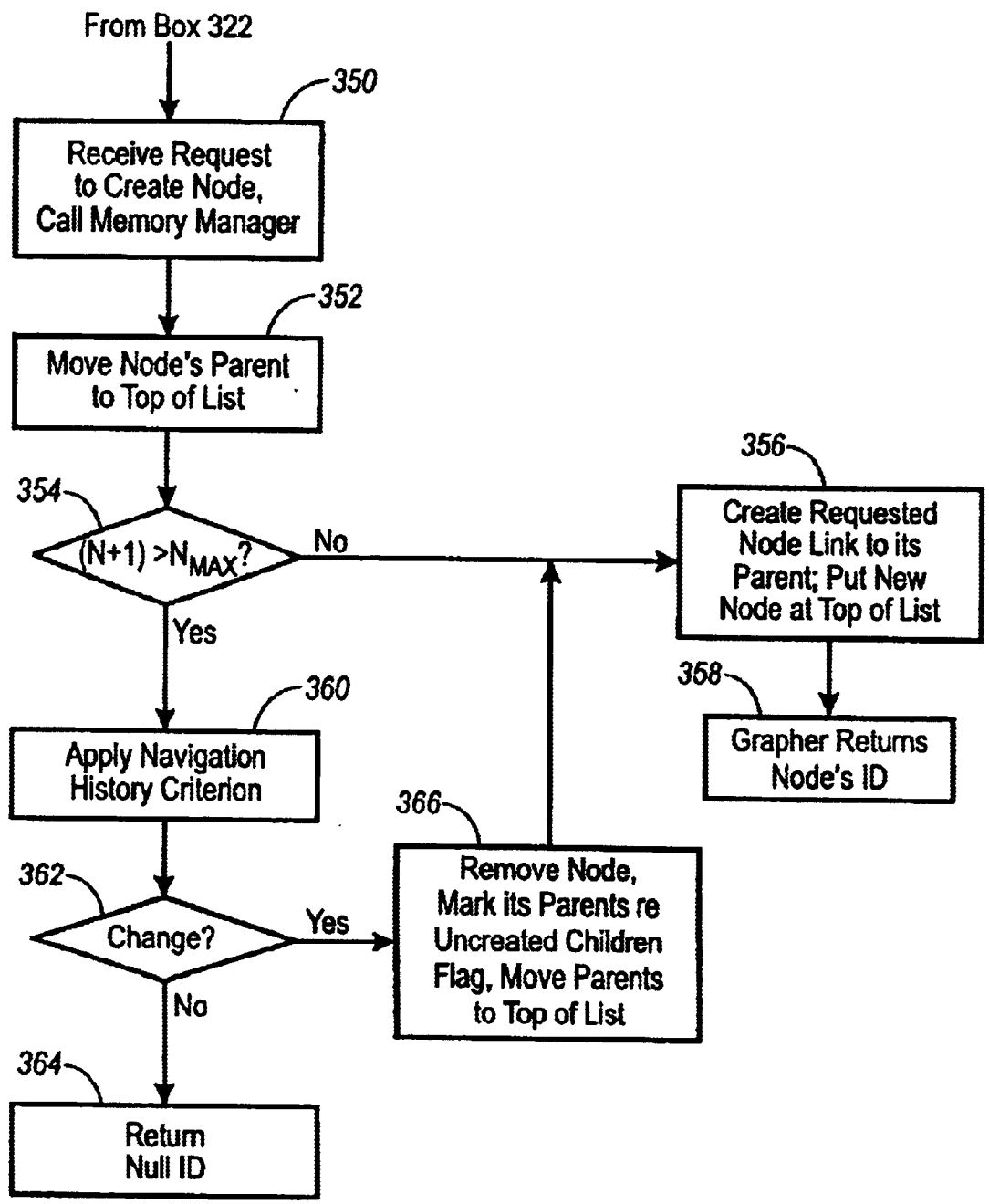
FIG. 8 is a flow chart showing how routines in FIG. 4 respond to requests to create a node.

FIG. 8 shows how grapher routines 220 and memory management routines 226 respond after grapher routines 220 receive, in box 350, a request from client 212 to create a child node as in box 322 in FIG. 7. As shown in box 350, grapher routines 220 call memory management routines 226, which perform most of the other operations shown in FIG. 8.

In box 352, routines 226 move the parent node of the uncreated child node to the top of list 232. As can be seen in FIG. 6, this and other movements of nodes within the list can be made by changing the pointers in fields 290, 292, through 294.

In box 354, routines 226 then test whether a node can be added to memory without exceeding the maximum number of nodes allowed in memory, by comparing (N+1) with $N_{MAX}$. If (N+1) is not greater than $N_{MAX}$, routines 226 call grapher routines 220 with a request to create the new node and with appropriate link information, in box 356. Operations of grapher routines 220 in response to these calls can be implemented as described below in relation to FIG. 10. Creation of the new node includes creating the link from the new node's parent to the new node and can also include creating links from the new node to any of its child nodes that are already created and initializing appropriate flags or other data to indicate that links are expanded and to indicate whether the new node has any uncreated child nodes and that it has been walked by walker routines 222. Routines 226 also put a new entry for the new node at the top of list 232 before returning to grapher routines 220. Grapher routines 220 then return the new node's ID in box 358.

It is worth noting that the value of $N_{MAX}$ cannot be as great as the total number of nodes that could be held in memory because links must also be in memory. The maximum possible number of links between N nodes would be (N!), but it would ordinarily not be necessary to keep $N_{MAX}$ so small that $((N_{MAX} * NodeSize) + (N_{MAX}! * LinkSize))$ does not exceed the available memory space. If, in a particular application, errors are occurring because of insufficient space for link creation, it may be necessary to increase the memory space allocated to directed graph data structure 230.

If adding a node would exceed the maximum allowed number of nodes, routines 226 apply a navigation history criterion in box 360 to determine whether to change which part of the graph is in memory, such as by removing a node and adding the new node. Routines 226 branch on the result in box 362: If the criterion determines not to change which part of the graph is in memory, routines 226 return the null ID, in box 364. But if the criterion determines to change, routines 226 call grapher routines 220 with a request to remove a node from memory, in box 366. Routines 226 also remove the node from list 232 and, through another request to grapher routines 220, cause its parent to be marked with a flag indicating it has uncreated child nodes. Operations of grapher routines 220 in response to these calls can be implemented as described below in relation to FIG. 11. Routines 226 then move the parent node to the top of list 232.

At this point, routines 226 can create the requested node in box 356 and grapher routines 220 can return its node ID, in box 358, as described above. If, on the other hand, routines 226 returned the null ID in box 364, grapher 220 can return data indicating that the node could not be created.

Figure 9:
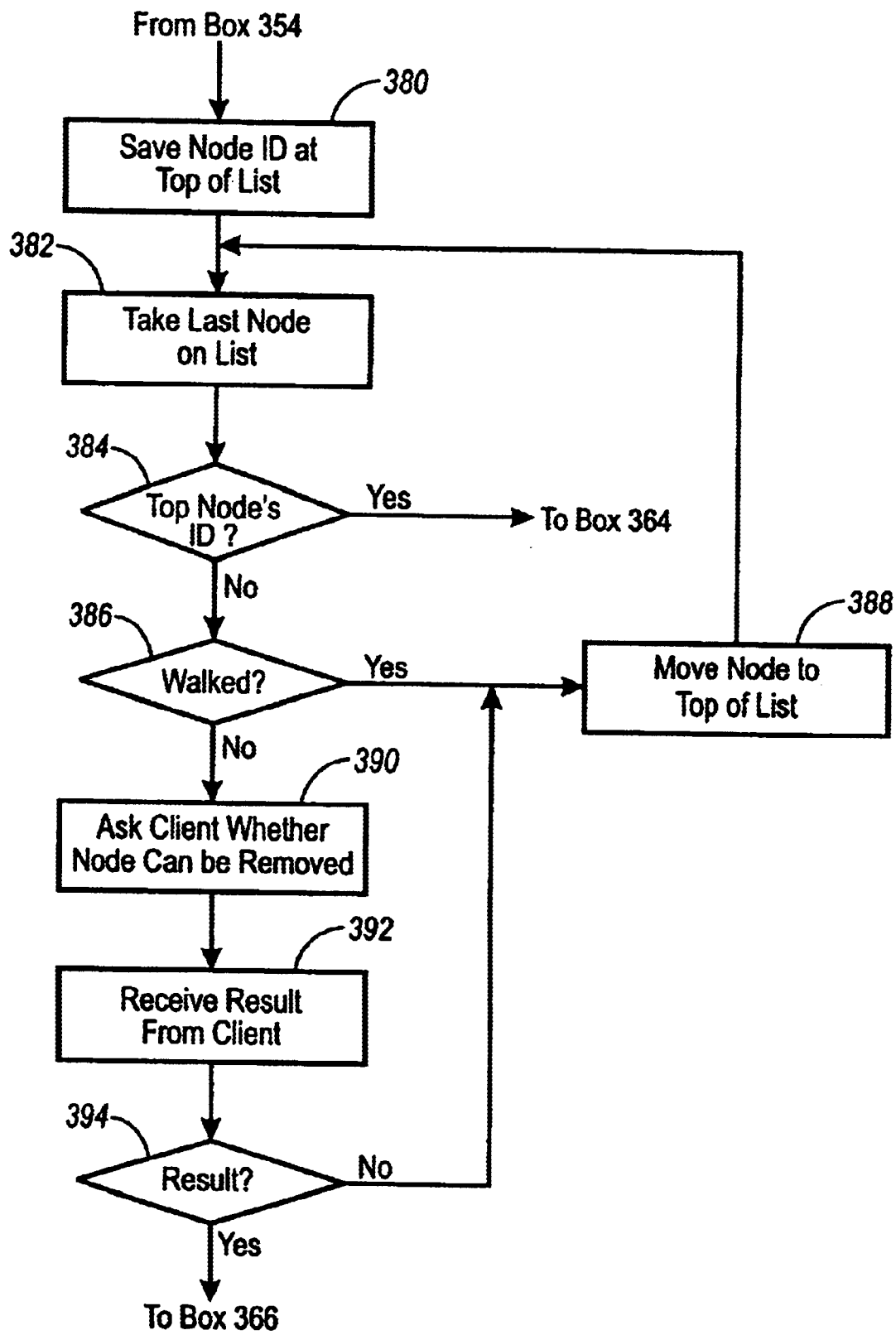
FIG. 9 is a flow chart showing in greater detail how the memory management routines apply a navigation history criterion.

FIG. 9 shows in greater detail one way in which boxes 360 and 362 in FIG. 8 can be implemented. The general approach is to go through list 232 from the bottom to the top, trying to find a node that can be removed. This is an example of a navigation history criterion because the order of the nodes in list 232 depends on the navigation signals that have been received, as a result of changes like those in boxes 352 and 356, and as a result of any other events that have traversed nodes, such as painting and layout operations.

In box 380, the node ID of the top entry of list 232 is saved. Then, in box 382, the last node ID on list 232 is taken. The test in box 384 compares the last node ID with the saved top node ID, thus beginning an iterative loop that tests each node in list 232 until it finds one that can be removed.

The test in box 386 first tests the node's orient and map counts to determine whether the node was walked during the most recent orienting or mapping walk in box 306 in FIG. 7. In addition to keeping nodes in memory that are currently displayed, this test ensures that root node 252 in FIG. 5 will not be removed from memory. The test in box 386 may, for example, be made with a call to walker routines 222, which can compare the node's orient and map counts with the current values of the global counters for those walks.

If the node was walked during the most recent orienting or mapping walk, it cannot be removed, so it is moved to the top of list 232 in box 388, and the next node is taken. But if the node was not walked, it is a candidate for removal, and a call is made to client 212 in box 390 with a request to determine whether the node can be removed. Client 212 may have any appropriate additional criterion for determining whether a node can be removed. The result received from client 212 in box 392 determines which branch is taken from box 394. If the result is that the node cannot be removed, the node is moved to the top of list 232 in box 388 and another node is taken in box 382. But if the result is that the node can be removed, it is removed as in box 366 in FIG. 8.

When all the nodes have been taken, the test in box 384 will determine that the two node IDs match, meaning that list 232 does not include any nodes that can be removed. Therefore, the null ID is returned as in box 364 in FIG. 8.

The navigation history criterion applied in box 360 in FIG. 8 thus includes at least two subcriteria: First, a node that is removed should be a less recently handled node, as indicated by its position in list 232, and, second, a node that is removed should not be a node that was walked during the most recent orient and map walks.

Figure 10:
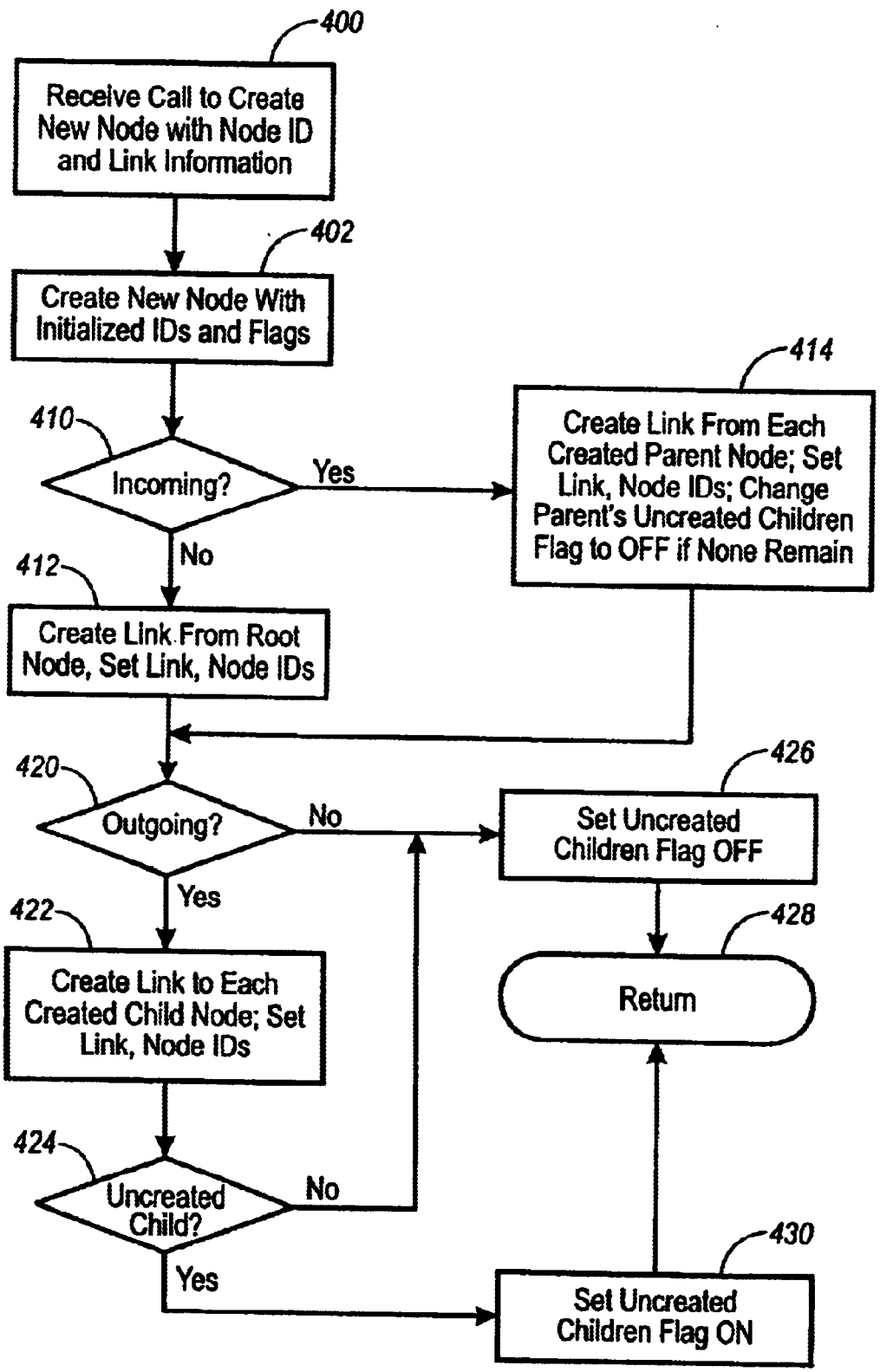
FIG. 10 is a flow chart showing in greater detail how the routines in FIG. 4 create a node.

FIG. 10 shows in greater detail one way in which node creation in box 356 in FIG. 8 can be implemented. Node creation begins when grapher routines 220 receive a call from memory management routines 226 to create a new node in box 400. The call includes the node ID of the new node and information about the new node's incoming and outgoing links.

Grapher routines 220 respond by creating a new node like node 258 in FIG. 5, in box 402. Grapher routines 220 also initialize the first parent link ID and the first child link ID and flags included in the new node. An uncreated children flag can be initialized OFF to indicate that the new node does not have any uncreated child nodes. Also, counters that can be used to determine whether the node was recently walked during orienting or mapping can be initialized to an appropriate value.

Then, in box 410, grapher routines 220 branch on whether the new node has any incoming links from parent nodes that have been created.

If not, a new link is created to root node 252, in box 412. Creation of this new link includes obtaining a link ID and creating a link like link 254 in FIG. 5, with the node ID of root node 252 as the parent node ID and the node ID of the new node as the child node ID. In addition, other appropriate link IDs are set. For example, if this is the first outgoing link from root node 252, the new link's ID is loaded into root node 252 as its first child link ID, and the new link's previous and next child link IDs are set to NULL. Otherwise, the new link's previous child link ID is set to the last of the child links of root node 252, and that link's next child link ID is set to the new link's ID, while the new link's next child link ID is set to NULL.

If, on the other hand, the new node has one or more incoming links from parent nodes that have been created, a link is created for each of its created parent nodes, in box 414. Each new link has the appropriate node ID as its parent node ID and the node ID of the new node as its child node ID. In addition, other appropriate IDs are set. For example, if a new link is the first outgoing link from a parent, the new link's ID is loaded into the parent node as its first child link ID, and the new link's previous and next child link IDs are set to NULL. Otherwise, the new link's previous child link ID is set to the last of the child links of the parent node, and that link's next child link ID is set to the new link's ID, while the new link's next child link ID is set to NULL. In box 414, grapher routines 220 can also check each parent node to determine whether it has any remaining uncreated children, changing its uncreated children flag to OFF if not.

Similarly, grapher routines 220 branch in box 420 based on whether the new node has any outgoing links. If so, a new link is created to each created child, in box 422. Creation of this new link includes obtaining a link ID and creating a link like link 254 in FIG. 5. If the new link is replacing a link from root node 252, it is the first incoming link of the child node, so that the child node's first parent link ID is the new link's ID. The new link also has the node ID of the new node as its parent node ID and the node ID of the child node as its child node ID. In addition, other appropriate link IDs are set. For example, if this is the first outgoing link from the new node, the new link's ID is loaded into the new node as its first child link ID, and the new link's previous and next child link IDs are set to NULL. Otherwise, the new link's previous child link ID is set to the last of the child links of the new node, and that link's next child link ID is set to the new link's ID, while the new link's next child link ID is set to NULL. Similarly, unless the new link is replacing a link from root node 252, in which case its previous and next parent link IDs are NULL, the new link's previous parent link ID is set to the last of the parent links of the child node, and that link's next parent link ID is set to the new link's ID, while the new link's next parent link ID is set to NULL.

After creating outgoing links to created children, grapher routines 220 test in box 424 whether the new node has any uncreated children. If not, or if the new node has no outgoing links, the uncreated children flag is set OFF in box 426 before returning in box 428. But if there is at least one uncreated child, the uncreated children flag is set ON in box 430 before returning in box 428.

Figure 11:
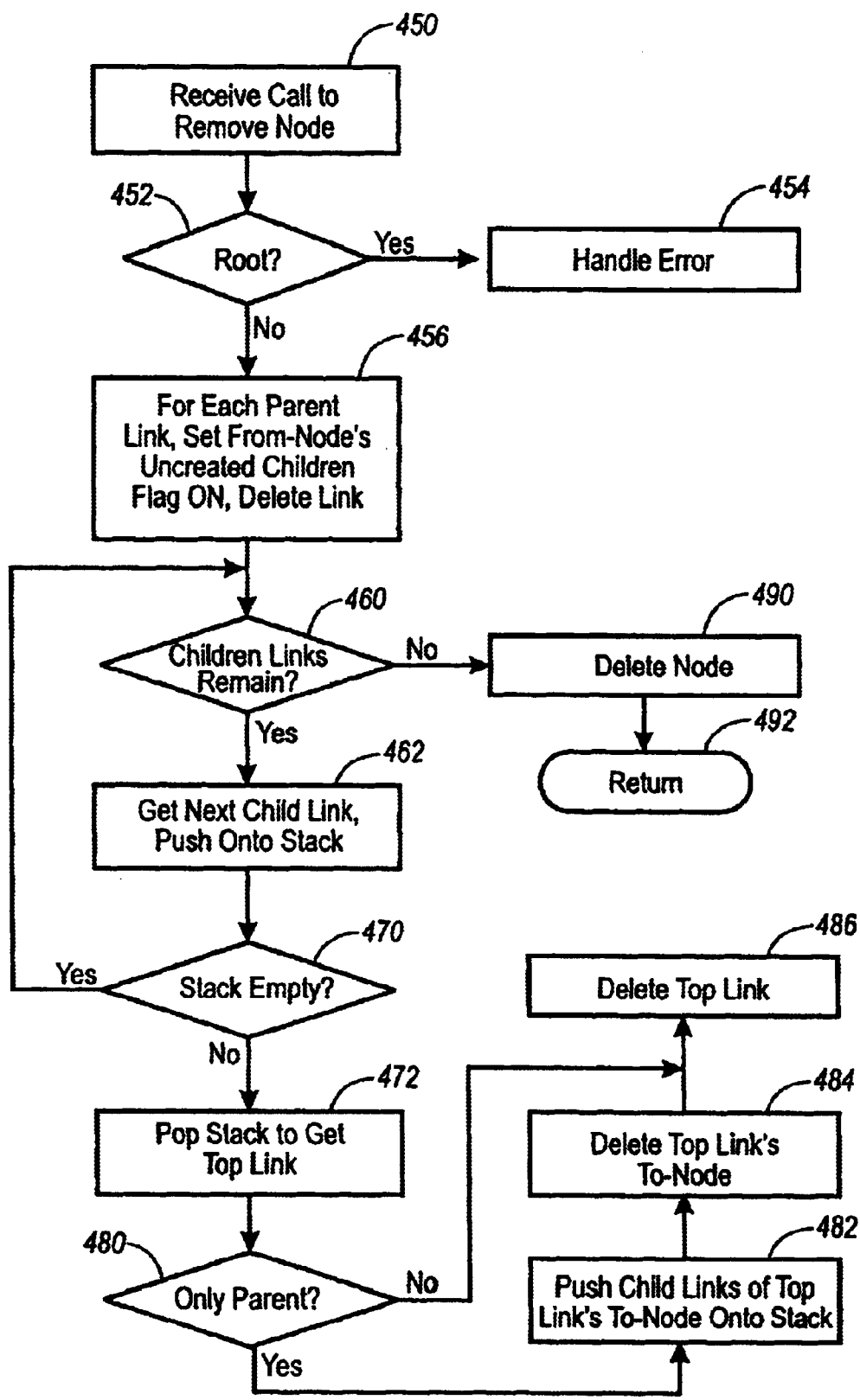
FIG. 11 is a flow chart showing in greater detail how the routines in FIG. 4 remove a node.

FIG. 11 shows in greater detail one way in which node removal in box 366 in FIG. 8 can be implemented. Node removal begins when grapher routines 220 receive a call from memory management routines 226 to remove a node in box 450. The call includes the node ID of the node being removed.

Grapher routines 220 respond by testing in box 452 whether the node ID received in box 450 is that of root node 252. If so, routines 220 handle the error in an appropriate way in box 454, such as by returning without further action.

The test in box 452 could also determine whether the node ID received in box 450 is that of a node that cannot be removed for another reason. For example, if the navigation signals could include bookmarks or the like, client 212 might not permit removal of a node with a bookmark.

If the node ID is not that of root node 252 or another node that cannot be removed, grapher routines 220 use the node ID to access the node and go through its linked list of parent links, in box 456. For each parent link, grapher routines 220 set its from-node's uncreated children flag ON, then delete the parent link. In deleting a parent link, grapher routines 220 can also modify its from-node's linked list of child links to omit the deleted link. Grapher routines 220 can also call memory management routines 226 to move each from-node handled in box 456 to the top of list 232.

Then grapher routines 220 begin an outer iterative loop that goes through the node's linked list of child links, continuing until the test in box 460 finds no more child links. In box 462, grapher routines 220 begin each iteration of the outer loop by accessing the node's linked list to get the link ID of the next child link, and by then pushing the link ID onto a stack.

Grapher routines 220 then begin an inner iterative loop that handles each link ID in the stack. In box 472, grapher routines 220 begin each iteration of the inner loop by popping the stack to get the link ID of the top link from the stack, the link most recently pushed onto the stack. Box 480 then tests whether the top link is the only parent of its to-node, by using the link ID to access the to-node's linked list of parent links. If so, box 482 accesses the to-node's linked list of child links and pushes the link IDs of the child links onto the stack. Then, box 484 deletes the to-node from memory. In either case, box 486 deletes the top link from box 472. If the top link is not the only parent of its to-node, box 486 can also modify the to-node's linked list of parent links to omit the deleted link.

When the stack is empty in box 470 and all child links have been handled in box 460, box 490 deletes the node whose node ID was received in box 450 and box 492 returns. Box 490 could also include related operations, such as deleting any bookmarks or the like for the node being deleted.

The technique of FIG. 11 only removes one level of descendants of a removed node, and does not remove descendants of a removed node that have other ancestors in memory. The technique could alternatively be implemented by replacing boxes 482 and 484 with a recursive call with the node ID to a procedure that begins with box 460 and ends after box 490. The technique could also be modified to remove descendants that have other ancestors in memory, were it appropriate to do so.

Operations like those described above in relation to boxes 412, 414, 422, 456, 482, and 486 could also be performed in creating or removing links independent of node creation and removal.

C.5. Results

An implementation similar to that described above in relation to FIGS. 4–11 has been used in a browser that presents representations of node-link structures like those illustrated in copending coassigned U.S. patent application Ser. No. 09/124,528, entitled "Presenting Node-Link Structures with Modification", incorporated herein by reference.

As can be understood from that application, navigation signals will often request that a node be moved from elsewhere in the representation to the center of focus for better viewing. In many such cases, the requested movement will result in the addition of an extra layer of nodes at the periphery of the representation, nodes which will already be present in memory because they are children of a node that was traversed during a previous iteration. Therefore, in those cases a previous iteration produced a predictive node-link set that defines the set of elements that will be traversed in a subsequent iteration, and, in general, previous iterations produce predictive node-link sets that are more likely to define the set of elements that will be traversed by subsequent iterations.

C.6. Variations

The implementation described above could be varied in many ways within the scope of the invention.

An implementation similar to that described above has been successfully executed on processors of IBM compatible PCs, but implementations could be executed on other machines with any appropriate processors.

An implementation similar to that described above has been successfully executed using C++ in 32-bit Windows environments, but other programming languages and environments could be used, including non-object-oriented environments, and other platforms could be used, such as Lisp, a Unix environment, ANSI C, Pascal, and so forth.

An implementation similar to that described above has been successfully executed with node-link data presented in a generic XML format and in an experimental format, but the invention could be implemented with any suitable type of node-link data, whether static or dynamic, and accessible in any appropriate way, such as in memory or over a network.

An implementation similar to that described above has been implemented with each iteration preparing and presenting a representation of a graph in response to a navigation signal, but the invention could be implemented with other types of iterations invoked by other types of signals or calls and that include automatically traversing a set of elements of a node-link structure. A number of examples of operations that can include automatic traversal are mentioned above.

An implementation similar to that described above has been successfully executed with navigation signals received from a keyboard and mouse and relating to a displayed representation of a node-link structure like the representations disclosed in Lamping et al., U.S. Pat. No. 5,619,632 and in copending coassigned U.S. patent application Ser. No. 09/124,528, entitled "Presenting Node-Link Structures with Modification", both incorporated herein by reference. The invention could, however, be implemented with or without navigation signals; for example, elements could be moved around in response to different sortings of the children of a node or in response to the application of different filters to elements of a structure. Also, the invention could be implemented with any appropriate type of expand and contract signals or other navigation signals, including signals resulting from external queries, selection of a menu entry-like item requesting expansion below an indicated node or link, or selection of a menu entry-like item requesting expansion below the current focus. The navigation signals could instead relate to an illusory space like those produced by videogames or virtual reality environments or a presentation space other than a display and navigation signals could instead be produced by any appropriate user input device, including other kinds of pointing devices and other kinds of devices for receiving alphanumeric or linguistic input such as voice, gestures, or other modes of user input. Further, the invention could be implemented with other types of representations of node-link structures. The invention could be implemented without animation or with any appropriate animation techniques.

An implementation similar to that described above has been implemented with layout data obtained in the manner described in copending coassigned U.S. patent application Ser. No. 09/124,805, entitled "Local Relative Layout of Node-Link Structures in Space with Negative Curvature", incorporated herein by reference, but the invention could be implemented with or without layout as such, or by obtaining layout data in other ways, such as by laying out the entire node-link structure separately for each representation or by laying out the node-link structure in other ways.

An implementation similar to that described above has been implemented with a node-link structure mapped into the unit disk and then painted in accordance with copending coassigned U.S. patent application Ser. No. 09/124,529, entitled "Mapping a Node-Link Structure to a Rendering Space Beginning from any Node", incorporated herein by reference, but the invention could be implemented with or without mapping, or with a node-link structure mapped and presented in any other appropriate way, including mapping it into any other appropriate rendering space and presenting it in any other appropriate display space, including three-dimensional rendering and display spaces.

An implementation similar to that described above has been implemented in which, during traversal, uncreated children of traversed nodes are created and least recently visited nodes are removed to obtain predictive node-link data, but the invention could be implemented with various other approaches to obtain node-link data that are more likely to define the set of elements to be traversed next. The above implementation uses a combination of a proximity-based and a recency-based approach, with proximity determining which nodes are created and with recency determining which are removed. This approach seems to work especially well for a browsing application in which short, scrolling movements are made across a representation. Other appropriate approaches could be used, including similarity-based approaches, such as loading a clone of any node in the view, together with the clone's nearby nodes. Also, any appropriate combination of proximity, recency, and similarity could be used, depending on the characteristics of the particular node-link data structure being traversed. In particular, other approaches may work better for applications in which large, jumping movements are made between discretely traversed regions of a structure.

The implementation described above is synchronous, in that nodes are created when requested, but the invention could be implemented asynchronously, such as with node creation performed in the background, such as by an appropriate thread handled by the client during free cycles.

The implementation described above applies a navigation history criterion that includes subcriteria relating to how recently a node was handled and to whether a node was walked during the most recent paint operation. Any other suitable criterion could be applied to determine whether to remove a node, such as a criterion based on difficulty of creating a node, another criterion based on probability of creating a node, or a combined criterion based both on difficulty and probability, where each may be reflected in a figure of merit and the node for which the product of the figures of merit is lowest.

The implementation described above preserves information about navigation history in a linked list data structure for node IDs, but navigation history information could be preserved in any other suitable form.

The implementation described above modifies which part of node-link data is in memory by removing data for a node and adding data for another node. Modifications could be made in any other appropriate way.

The implementation described above uses node-link data that include expansion flags of links to define a tree within a graph as disclosed in copending coassigned U.S. patent application Ser. No. 09/124,338, entitled "Node-Link Data Defining a Graph and a Tree Within the Graph", incorporated herein by reference, but the invention could be implemented with a node-link structure defined in any other appropriate way. Specifically, the implementation described above employs a directed graph data structure in which a link is represented as an item in two linked lists, one for the outgoing links from its from-node and one for the incoming links to its to-node. Any other suitable data structure could be employed.

The implementation described above employs a maximum number of nodes to indicate memory capacity. Other measures of memory capacity could be used, such as the total number of nodes plus links or the total size of the node-link data in memory.

The implementation described above can handle directed graphs, including cyclic directed graphs, but the invention could be implemented for other types of graphs by converting other types of links to appropriate combinations of directed links or by otherwise providing a protocol for mapping the structure of a graph to a tree. For example, an undirected link between two nodes could be converted to a pair of directed links between the same nodes or could be assigned a direction based on an appropriate criterion. In general, a representation in which all undirected links have been converted to a pair of directed links is likely to be visually confusing, because each pair of directed links results in a cycle, but this confusing might be overcome by presenting cycles in another way.

In the implementation described above, acts are performed in an order that could in many cases be modified.

Also, in the implementation described above, several software portions are distinguished, such as grapher, walker, painter, memory management, and math routines and the client, but the invention could be implemented with other combinations of hardware and software and with software organized in any appropriate way.

D. Applications

The invention has been applied in providing an interactive browser of node-link structures. The invention could be applied in a variety of contexts in which node-link structures are visualized. In particular, the invention could be applied in visualizing web-related structures such as the structure formed by a cached set of web pages or other web objects.

More generally, the invention could be applied to provide a browser for organization charts, file system hierarchies, hypertext hierarchies, world wide web connectivity structures, parts breakdowns, SGML structures, or any other large node-link structures. The browser could be used in editing structures or their contents.

E. Miscellaneous

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of controlling which part of a body of node-link data defining a node-link structure is in a memory, where the body of node-link data defines the node-link structure, and the part of the body of node-link data that is in the memory is less than all of the body of node-link data; the method comprising:

displaying a representation of at least a subset of a current set of elements of the node-link structure in a user interface;

performing a series of iterations in response to user interaction during said displaying, each iteration including automatically traversing said current set of elements of the node-link structure; at least one of the iterations comprising:

while automatically traversing the current set of elements, modifying, in response to navigation signals, which part of the body of node-link data is in the memory to obtain a modified part of the body of node-link data in memory; the modified part being more likely to define a next set of elements that will be traversed by the next iteration.

2. The method of claim 1 in which the act of modifying which part of the body of node-link data is in the memory comprises:

determining whether to remove any of the part of the body of node-link data in the memory; and upon determining to remove some of the part of the body of node-link data in the memory, applying a criterion to determine which of the part of the body of node-link data in the memory to remove.

3. The method of claim 2 in which each iteration receives a navigation signal from a user and the criterion is a navigation history criterion.

4. The method of claim 2 in which the criterion selects an element that is least recently traversed.

5. The method of claim 4 in which the method further comprises:

maintaining a list of nodes defined by the part of the body of node-link data that is in memory; the nodes being ordered within the list according to how recently each node has been traversed;

the act of applying a criterion comprising selecting a node that is least recently traversed from the list.

6. The method of claim 1 in which the act of modifying which part of the body of node-link data is in memory comprises:

determining whether the iterations set of elements includes an element with children that are not defined by the part of the body of node-link data in memory; and if so, determining to modify the part of the body of node-link data in memory to obtain a modified part of the body of node-link data that defines the children that are not defined.

7. The method of claim 6 in which the part of the body of node-link data in memory includes uncreated children data indicating, for each node defined by the part of body of node-link data in memory, whether the node has children that are not defined by the part of the body of node-link data in memory; the act of determining whether the iteration's set of elements includes an element with children that are not defined comprising:

accessing the uncreated children data to determine whether any of the nodes in the iteration's set of elements has children that are not defined by the part of the body of node-link data in memory.

8. The method of claim 1 in which each iteration further comprises preparing and presenting a next representation of the node-link structure; the act of preparing and presenting the next representation of the node-link structure including automatically traversing the iteration's set of elements.

9. The method of claim 1 in which the part of the body of node-link data in the memory includes, for each node in the iteration's set of elements, a node element representing the node; the act of modifying which part of the body of node-link data is in memory comprising:

creating an additional node element representing a node that is not in the iteration's set of elements.

10. The method of claim 9 in which the act of modifying which part of the body of node-link data is in memory further comprises:

creating an additional link element representing a link to the node that is not in the iteration's set of elements.

11. The method of claim 9 in which the part of the body of node-link data in the memory includes at least one node element representing a node that is not in the iteration's set of elements; the act of modifying which part of the body of node-link data is in memory further comprising:

removing at least one node element representing a node that is not in the iteration's set of elements.

12. The method of claim 9 in which the part of the body of node-link data in the memory includes, for each node element representing a node that is not in the iteration's set of elements, at least one link element representing a link to or from the represented node; the act of modifying which part of the body of node-link data is in memory further comprising:

for each node element that represents a node that is not in the iteration's set of elements, removing at least one link element representing a link to or from the represented node.

13. The method of claim 1 in which the modified part of the body of node-link data defines the set of elements that will be traversed by the next iteration.

14. A system comprising:

a user interface including a display;

memory for storing node-link data; and a processor for controlling which part of a body of node-link data defining a node-link structure is in the memory, where the body of node-link data defines the node-link structure, and the part of the body of node-link data that is in the memory is less than all of the body of node-link data, and receiving navigation signals; the processor displaying a representation of at least a subset of a current set of elements of the node-link structure in the display; performing a series of iterations, each iteration including automatically traversing a the current set of elements of the node-link structure; the processor, in performing at least one of the iterations and while automatically traversing the current set of elements, modifying, in response to the navigation signals, which part of the body of node-link data is in the memory to obtain a modified part of the body of node-link data in memory; the modified part being more likely to define a next set of elements that the processor will traverse in performing the next iteration.

15. An article of manufacture for use in a system that includes:

a user interface including a display;

memory for storing node-link data; a storage medium access device; and a processor for controlling which part of a body of node-link data defining a node-link structure is in the memory, where the body of node-link data defines the node-link structure, and the part of the body of node-link data that is in the memory is less than all of the body of node-link data, receiving navigation signals, and connected for receiving data accessed on a storage medium by the storage medium access device; the article of manufacture comprising:

a storage medium; and instruction data stored by the storage medium; the instruction data indicating instructions the processor can execute; the processor, in executing the instructions, displaying a representation of at least a subset of a current set of elements of the node-link structure in the display; performing a series of iterations, each iteration including automatically traversing the current set of elements of the node-link structure; the processor, in performing at least one of the iterations and while automatically traversing the current set of elements, modifying, in response to the navigation signals, which part of the body of node-link data is in the memory to obtain a modified part of the body of node-link data in memory; the modified part being more likely to define a next set of elements that the processor will traverse in performing the next iteration.

16. A method of transferring data between first and second machines over a network, the second machine including a user interface including a display, memory and a processor connected for accessing the memory; the memory being for storing instruction data and for storing node-link data; the processor being for controlling which part of a body of node-link data defining a node-link structure is in the memory, where the body of node-link data defines the node-link structure, and the part of the body of node-link data that is in the memory is less than all of the body of node-link data, and receiving navigation signals; the method comprising:

establishing a connection between the first and second machines over the network; and operating the first and second machines to transfer instruction data from the first machine to the memory of the second machine; the instruction data indicating instructions the processor can execute; the processor, in executing the instructions, displaying a representation of at least a subset of a current set of elements of the node-link structure in the display; performing a series of iterations, each iteration including automatically traversing the current set of elements of the node-link structure; the processor, in performing at least one of the iterations and while automatically traversing the current set of elements, modifying, in response to the navigation signals, which part of the body of node-link data is in the memory to obtain a modified part of the body of node-link data in memory; the modified part being more likely to define a next set of elements that the processor will traverse in performing the next iteration.

17. The method of claim 1, wherein said modifying in response to navigation signals includes modifying in response to a navigation history criterion produced based upon navigation signals.

18. The system of claim 14, wherein said modifying in response to navigation signals includes modifying in response to a navigation history criterion produced based upon navigation signals.

19. The article of claim 15, wherein said modifying in response to navigation signals includes modifying in response to a navigation history criterion produced based upon navigation signals.

20. The method of claim 16, wherein said modifying in response to navigation signals includes modifying in response to a navigation history criterion produced based upon navigation signals.

* * * * *

UNITED STATES PATENT AND TRADEMARK OFFICE
CERTIFICATE OF CORRECTION

PATENT NO. : 6,654,761 B2
DATED : November 25, 2003
INVENTOR(S) : Tichomir G. Tenev, John O. Lamping and Ramana B. Rao It is certified that error appears in the above-identified patent and that said Letters Patent is hereby corrected as shown below:

Column 19,
Line 26, delete "iterations" and insert -- current --;
Line 39, delete "iteration's" and insert -- current --.

Signed and Sealed this

Sixth Day of April, 2004

JON W. DUDAS
*Acting Director of the United States Patent and Trademark Office*